(12) United States Patent
Hanamura et al.

(10) Patent No.: US 9,277,073 B2
(45) Date of Patent: Mar. 1, 2016

(54) SCANNER WITH DOCUMENT SIZE IDENTIFICATION CAPABILITY (71) Applicant: SEIKO EPSON CORPORATION, Tokyo (JP)

(72) Inventors: Osamu Hanamura, Nagano (JP); Toshimitsu Ohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/446,925

(22) Filed: Jul. 30, 2014

(65) Prior Publication Data

US 2015/0062664 A1    Mar. 5, 2015

(30) Foreign Application Priority Data

Aug. 30, 2013  (JP) .................. 2013-179097

(51) Int. Cl.
*H04N 1/00* (2006.01)

(52) U.S. Cl.
CPC ....... *H04N 1/00708* (2013.01); *H04N 1/00689* (2013.01); *H04N 1/00734* (2013.01); *H04N 1/00755* (2013.01); *H04N 1/00769* (2013.01); *H04N 1/00814* (2013.01)

(58) Field of Classification Search
None
See application file for complete search history.

(56) References Cited

U.S. PATENT DOCUMENTS 8,270,042 B2 * 9/2012 Ishido .................. 358/449

FOREIGN PATENT DOCUMENTS

JP    2007-028185 A    2/2007

* cited by examiner

*Primary Examiner* — Paul F Payer
(74) *Attorney, Agent, or Firm* — Global IP Counselors, LLP

(57) ABSTRACT

A scanner identifies a document size on the basis of the intensity of light outputted in a photometric condition different from a first photometric condition, by photometric units provided to a position subject to determination that is a position excluding a position where light of an intensity not less than a first threshold value is received in the first photometric condition, among a plurality of positions to which the photometric units are provided. The first photometric condition is a condition where a document cover is open and a light-emitting unit is not emitting light.

9 Claims, 5 Drawing Sheets

FIRST PHOTOMETRIC CONDITION

SECOND PHOTOMETRIC CONDITION

THIRD PHOTOMETRIC CONDITION

FOURTH PHOTOMETRIC CONDITION

SCANNER WITH DOCUMENT SIZE IDENTIFICATION CAPABILITY

CROSS-REFERENCE TO RELATED APPLICATIONS

This application claims priority to Japanese Patent Application No. 2013-179097 filed on Aug. 30, 2013. The entire disclosure of Japanese Patent Application No. 2013-179097 is hereby incorporated herein by reference.

BACKGROUND

1. Technical Field

The present invention relates to a technique for identifying a document size on the basis of a measured intensity of light.

2. Related Art

Conventionally known is a technique for identifying a document size of a document being scanned on the basis of the intensity of light received by a one-dimensional image sensor (for example, Japanese Laid-open Patent Publication 2007-28185). In Japanese Laid-open Patent Publication 2007-28185, the amount of change in the intensity of light received at the one-dimensional image sensor is acquired until a state where a document cover is open changes to a state where the document cover is closed, and the document is determined not to be present at a position where this amount of change does not exceed a threshold value and the document is determined to be present at a position where the amount of change does exceed the threshold value. The length of the document is identified in the direction of the one-dimensional image sensor by determining whether or not the document is present in this manner for each of the positions of the one-dimensional image sensor.

However, in a case where ambient light is incident at an angle close to parallel to a document platen, then the intensity of the light received by the one-dimensional image sensor does not change significantly even when the document cover is closed. As such, a problem has emerged in that the document size is wrong.

SUMMARY

The present invention has been made in view of the above problem, and an objective thereof is to provide a technique with which a document size can be identified at high accuracy.

A scanner for achieving the aforementioned objective is provided with a light-emitting unit configured to irradiate a document with light, a plurality of photometric units configured to receive light reflected by the document and output an intensity of light, a detection unit configured to detect a state of a document cover configured to the document from an opposite side of the photometric units; and a control unit configured to identify a document size on the basis of the intensity of light outputted in a photometric condition different from a first photometric condition by the photometric units provided to a position subject to determination that is a position excluding a position where light with an intensity not less than a first threshold value is received in the first photometric condition, among a plurality of positions to which the photometric units are provided, and the first photometric condition is a condition where the document cover is open and the light-emitting unit is not emitting light. The photometric units and the light-emitting unit are configured to be positioned relative to the document on the same side.

In the aforementioned configuration, in a case where the light-emitting unit is not emitting light, then the light that is measured at the photometric units can be regarded as being ambient light emitted by a light source on the exterior of the scanner. In a case where the document cover is open, then the rate of light-blocking of the ambient light by the document cover is low. As such, in a case where the document cover is open, then at a position where the document is not present, there will be no light-blocking by the document and the ambient light will be measured at the photometric units. As such, a position where light of an intensity not less than the first threshold value is measured in the first photometric condition will be a position where there is little possibility that the document is present. By contrast, the positions subject to determination, which exclude positions where light of an intensity not less than the first threshold value was measured in the first photometric condition, will be positions where there is a significant possibility that the document is present.

Then, the control unit identifies the document size on the basis of the intensity of light measured in the photometric condition different from the first photometric condition by the photometric units provided to the positions subject to determination where there is a significant possibility that the document is present, out of the positions to which the photometric units are provided. The processing for identifying the document size can be carried out efficiently, because the document size need not be identified on the basis of the intensity of light measured by the photometric units in the photometric condition different from the first photometric condition at necessarily all of the positions to which the photometric units are provided.

Ambient light that is incident at an angle close to parallel to the document can be measured by the photometric units also in the first photometric condition where the document cover is open and the light-emitting unit is not emitting light. As such, even in a case where the ambient light is incident at an angle close to parallel to the document, the positions where there is little possibility that the document is present can have been excluded from the positions subject to determination. Therefore, performing the process for identifying the document size where the target is the positions subject to be determination makes it possible to identify the document size at high precision.

Furthermore, the control unit may acquire a determination difference, which is a difference between a minimum value of the intensity of light in a second photometric condition where an angle of the document cover has changed and the light-emitting unit is emitting light, and the intensity of light in a third photometric condition where the document cover is closed and the light-emitting unit is emitting light. Then, the control unit may determine the document size by determining that the position subject to determination where the determination difference is less than a second threshold value is a position where the document is present, and determining that the position subject to determination where the determination difference is not less than the second threshold value is a position where the document is present.

Herein, first, the positions subject to determination where the document is present shall be discussed. Irrespective of whether the document cover is open or is closed, a photometric unit at a position subject to determination where the document is present will measure as being intense a light obtained when the light emitted by the light-emitting unit is reflected at the document, and will not measure the ambient light as being intense due to the light-blocking by the document. As such, at a position subject to determination where the document is present, a photometric unit will measure light of a substantially constant intensity irrespective of the angle of the document cover, including even a state where the document cover is closed. As such, at a position subject to determination where the document is present, there will be a small difference between the intensity (minimum value) of light measured by the photometric units in the second photometric condition where the angle of the document cover has changed and the light-emitting unit is emitting light, and the intensity of light measured by the photometric units in the third photometric condition where the document cover is closed and the light-emitting unit is emitting light. For the angle of the document cover to change signifies that the angle of the document cover changes in a state where the document cover is open.

Next, a position subject to determination where the document is not present shall be discussed. A photometric unit at a position subject to determination where the document is not present will measure the ambient light at the beginning of the second photometric condition, and as the document cover comes increasingly closer to a closed state, will measure as being intense the reflected light obtained when the light emitted by the light-emitting unit is reflected at the document cover. In the second photometric condition, the angle of the document cover at which the reflected light obtained when the light emitted by the light-emitting unit is reflected at the document cover begins to be measured as being intense depends on the position at which the photometric units are present. However, acquiring a determination angle on the basis of the minimum value of the intensity of light measured by the photometric unit in the second photometric condition where the angle of the document cover changes makes it possible to assess the extent to which the intensity of light of the ambient light in the second photometric condition is small relative to the intensity of light of the reflected light obtained when the light emitted by the light-emitting unit is reflected at the document cover in the third photometric condition. That is to say, in the event that there is a large determination difference, which is the difference between the minimum value of the intensity of ambient light in the second photometric condition and the intensity of the reflected light obtained when the light emitted by the light-emitting unit is reflected at the document cover in the third photometric condition, then the ambient light has been received at the second photometric condition, and the position can be determined to be one where the document is not present.

Though a greater number of intensities of light require calculation processing in a case where the minimum value of the intensity of light measured by the photometric units in the second photometric condition where the angle of the document cover changes is acquired in this manner, the document size can be efficiently identified because the positions subject to calculation processing have been narrowed down to the positions subject to determination in advance.

Furthermore, the control unit may determine at least one of the photometric units and the light-emitting unit to be in failure in a case where a difference between the intensity of light in a fourth photometric condition where the document cover is closed and the light-emitting unit is not emitting light and the intensity of light in a third photometric condition where the document cover is closed and the light-emitting unit is emitting light is less than a predetermined third threshold value. In a case where the document cover is closed and the light-emitting unit is emitting light, then irrespective of whether the document is present or not, the light emitted by the light-emitting unit is reflected at either the document or the document cover and measured as being intense at the photometric units. In a case where the document cover is closed and the light-emitting unit is not emitting light, then irrespective of whether or not the document is present, light emitted by the light-emitting unit will not be measured at the photometric units, and the ambient light, too, will be reliably blocked at the document cover and not measured at the photometric units. That is to say, irrespective of whether or not the document is present, there will be a large difference between the intensity of light measured by the photometric units in the fourth photometric condition where the document cover is closed and the light-emitting unit is not emitting light and the intensity of light measured by the photometric units in the third photometric condition where the document cover is closed and the light-emitting unit is emitting light. The light-emitting unit and/or the photometric units can be determined to be in failure in a case where this difference is nevertheless smaller than the third threshold value.

Furthermore, a technique where the document size is identified as above holds true also as the invention of a document size identification method or document size identification program. Such a device (scanner), program, or method as above would in some instances be implemented as a single-function device (scanner) for identifying the document size, and in some instances would be implemented as a device (scanner) having multiple functions, including other function such as printing or communication, and a variety of modes would be encompassed.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the present invention shall be described below in the following order with reference to the accompanying drawings.

First embodiment
Other embodiments

First Embodiment

Figure 1A:
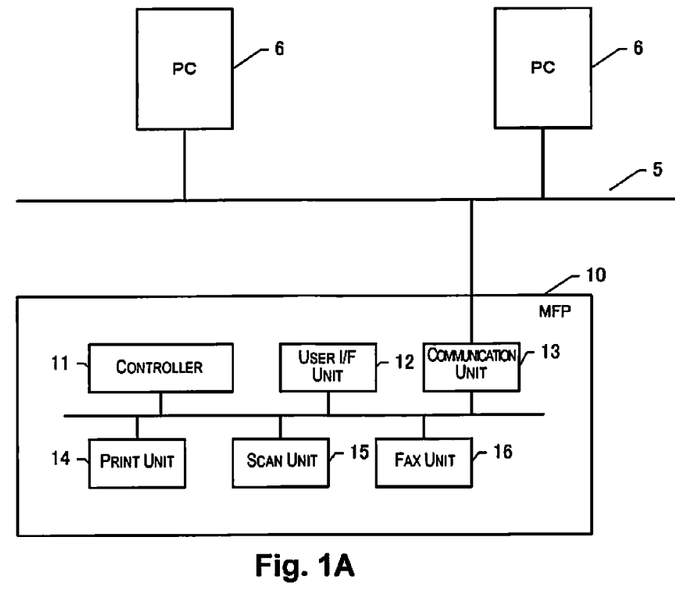
FIG. 1A is a block diagram of an MFP comprising a scan unit.

FIG. 1A is a block diagram illustrating the configuration of a scanner as in an embodiment of the present invention. The scanner as in the embodiment of the present invention is a multi-function printer (MFP) 10. The MPF 10 is provided with a scan function, a print function, a facsimile (fax) function, and the like. The MFP 10 is also connected to a host computer, such as a PC 6, over a network such as a LAN 5.

The MFP 10 is provided with a controller 11, a user I/F unit 12, a communication unit 13, a print unit 14, a scan unit 15, and a fax unit 16. The controller 11, serving as a control unit, is composed of a CPU, a non-volatile memory, a RAM, an ASIC, and the like, and controls the MFP 10 by having the CPU execute a variety of programs recorded onto the non-volatile memory. The communication unit 13 is provided with an interface circuit for implementing wireless LAN communication or wired LAN communication, and the like.

When a print job is acquired by the communication unit 13, the controller 11 controls the print unit 14 and executes printing on the basis of the acquired print job. The print unit 14 is provided with an actuator, a sensor, a drive circuit, and a mechanical component for executing printing on a print medium, such as a photographic paper, plain paper, or overhead projector paper (OHP) sheet, in a known print format such as an inkjet format or electrophotographic format. The user I/F unit 12 is provided with a touch panel display, a variety of operation keys, and the like.

Further, the fax unit 16 is provided with a modem for sending and receiving fax data over a telephone line, a circuit for detecting or generating a control signal for sending and receiving the fax data, a circuit for decoding the received fax data and encoding the fax data being sent, and the like. The fax unit 16 stores the fax data received from the telephone line in a non-volatile memory or the like. When an execution command for fax transmission or fax data for transmission is acquired by the communication unit 13, the controller 11 controls the fax unit 16 and issues the fax data for transmission to the telephone line.

Figure 1B:
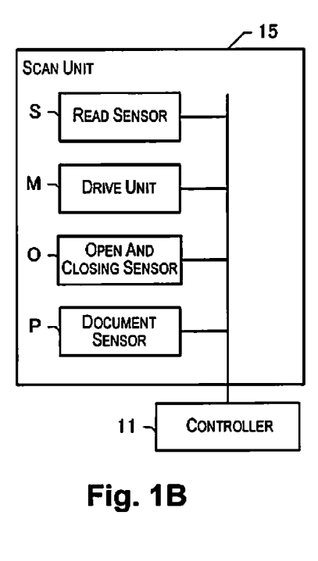
FIG. 1B is a block diagram of the scan unit.
Figure 1C:
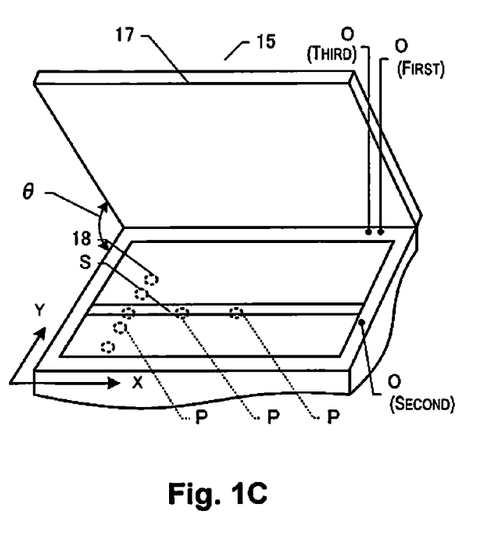
FIG. 1C is a schematic diagram of the scan unit.

FIG. 1B is a block diagram illustrating the configuration of the scan unit 15, and FIG. 1C is a schematic diagram of the scan unit 15. The scan unit 15 is provided with a read sensor S that is communicatively connected to the controller 11, a drive unit M, opening and closing sensors O, and document sensors P. The read sensor S is a sensor in which a plurality of imaging elements are arranged over a straight line that is parallel to the document, and outputs imaging information acquired by each of the imaging elements to the controller 11. The drive unit M is provided with a motor, a gear, a belt, and the like for scanning the read sensor S on the basis of a control signal coming from the controller 11. The direction of scanning of the read sensor S is a direction that is parallel to the document and perpendicular to the direction of arraying of the imaging elements. The controller 11 causes imaging to be performed at each of the imaging elements of the read sensor S while also causing the read sensor S to be scanned in the direction of scanning, and associates the position on the document with the imaging information acquired by each of the imaging elements, thereby generating scan image data about the document. The controller 11 either saves the scan image data in a non-volatile memory or the like, or outputs same to a device such as the PC 6.

As illustrated in FIG. 1C, the scan unit 15 is provided with a document platen 18 and a document cover 17. The document platen 18 is formed of a transparent glass or resin, in a rectangular plate shape. The document may be of a variety of shapes, but in the present embodiment, is understood to be a single sheet of medium that serves as the subject of reading in the scan unit 15. The document Q is placed on the document platen 18 so as to be parallel with the document platen 18. In the present embodiment, "document-side" signifies above the document platen 18. In the present embodiment, the document platen 18 is understood to form a horizontal surface. The read sensor S is provided below the document platen 18. The document cover 17 is coupled to the document platen 18 by a rotating shaft provided on one side of the outer edge of the document platen 18. The document cover 17 can be opened and closed about the rotating shaft, where the angle formed by the document platen 18 and the document cover 17 about the rotating shaft is defined as an angle θ, and a state where the angle θ of the document cover 17 reaches 0° is defined as a fully closed state. A state where the angle θ of the document cover 17 reaches 90° is defined as a fully open state, and a state where the angle θ of the document cover 17 reaches 30° is defined as a half-open state. These definitions, however, are those of the present embodiment, and there is no limitation thereto. Furthermore, an instance other than one where the document cover 17 is in the fully closed state is defined as being an instance where the document cover 17 is open. The light transmittance of the document cover 17 is understood to be 0%. The reflectance of light on the surface of the document cover 17 that faces the document platen 18 is understood to be greater than the reflectance of the document.

The opening and closing sensors O, serving as a detection unit, are photo-interrupters for detecting the state of the document cover 17 (a fully open state, a fully closed state, a half-open state). The photo-interrupters are pairs of an irradiation unit and a light-receiving unit. A signal indicative of the intensity of light received by the light-receiving unit is outputted by the opening and closing sensors O to the controller 11. There are a plurality of the opening and closing sensors O provided, and provided is a first opening and closing sensor O for which, in a case where the angle θ of the document cover 17 shifts from 30° or more to less than 30°, then the optical path between the irradiation unit and the light-receiving unit shifts from a state where light is not blocked by a light-blocking unit provided to the document cover 17 to a state where light is blocked. As such, the controller 11 is able to determine whether the document cover 17 is in the half-open state or not, on the basis of the signal coming from the first opening and closing sensor O. Further provided is a second opening and closing sensor O for which, in a case where the angle θ of the document cover 17 shifts from a value close to 0° (for example,3°) or higher to less than the value close to 0°, then the optical path between the irradiation unit and the light-receiving unit shifts from a state where light is not blocked by a light-blocking unit provided to the document cover 17 to a state where light is blocked.

As such, the controller 11 is able to determine whether the document cover 17 is in the fully closed state or not, on the basis of the signal coming from the second opening and closing sensor O. Also provided is a third opening and closing sensor O for which, in a case where the angle θ of the document cover 17 shifts from a value close to a right angle (for example, 87°) or higher to less than the value close to a right angle, then the optical path between the irradiation unit and the light-receiving unit shifts from a state where light is not blocked by a light-blocking unit provided to the document cover 17 to a state where light is blocked. As such, the controller 11 is able to determine whether the document cover 17 is in the fully open state or not, on the basis of the signal coming from the third opening and closing sensor O. In a case where the document cover 17 is in the fully closed state, then ambient light that is emitted from a light source outside the MFP 10 is blocked by the document cover 17, and does not reach the document platen 18. The document is read with the document cover 17 in the fully closed state, and the read sensor S captures a reflected image obtained when the illumination light emitted by an illumination unit provided to the read sensor S is reflected by the document.

Document sensors P (seven dashed circles) is provided to each of a plurality of positions below the document platen 18. The document sensors P are photo-interrupters for identifying the document size of the document placed onto the document platen 18. The document sensors P are provided with a light-emitting unit and a photometric unit, and the photometric units of the document sensors P measure the reflected light obtained when the light emitted from the light-emitting unit is reflected by the document or by the document cover 17. The photometric units of the document sensors also measure the ambient light in a case where the ambient light is not blocked by the document or by the document cover 17. A signal indicative of the intensity of light measured by the photometric unit is outputted by the document sensors P to the controller 11. In the present embodiment, "photometric unit-side" signifies below the document platen 18, and "the opposite side to the photometric units" signifies above the document platen 18.

The document sensors P are provided to each of five positions in the Y-axis direction, which is the axis parallel to the document platen 18. The document sensors P are also provided to each of three different positions in the X-axis direction, which is parallel to the document platen 18 and orthogonal to the Y-axis direction. Each of the document sensors P is assigned a unique identification code. The controller 11 acquires the signals indicative of the intensity of light measured by the photometric units from each of the document sensors P, and determines whether or not the document is present at the positions where the document sensors P are provided. A control signal for causing the light-emitting units of each of the document sensors P to emit light is also outputted from the controller 11 to each of the document sensors P.

Figure 2A:
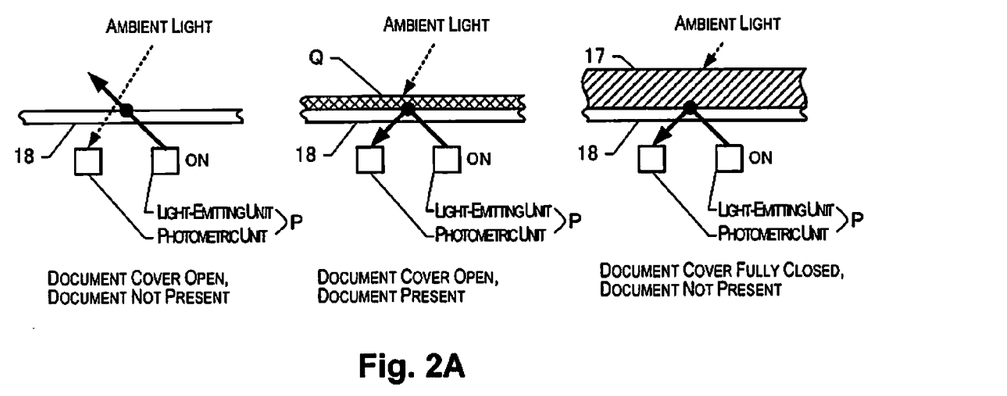
FIG. 2A is a schematic diagram of a document sensor.

FIG. 2A is a schematic diagram illustrating a document sensor P in a case where the light-emitting unit is emitting light. The positions where the document sensor P is provided refers to a position (a black dot) where the optical axis of light emitted by the light-emitting unit of the document sensor P intersects with the document platen 18. As illustrated on the left side of FIG. 2A, the photometric unit of a document sensor P provided to a position where the document Q is not present does not measure the light emitted by the light-emitting unit (solid line) and is able to measure the ambient light (dashed line) in a state where the document cover 17 is open. As illustrated in the middle of FIG. 2A, the photometric unit of a document sensor P provided to a position where the document Q is present measures the reflected light obtained when the light emitted by the light-emitting unit is reflected at the document Q, and does not measure as being intense the ambient light, in a state where the document cover 17 is open. As illustrated on the right side of FIG. 2A, in a case where the document cover 17 is in the fully closed state, the photometric unit of the document sensor P measures the reflected light obtained when the light emitted by the light-emitting unit is reflected at the document cover 17 or the document Q, and does not measure the ambient light.

The controller 11 identifies the document size on the basis of combinations of whether or not the document Q is present at each of the positions where the document sensors P are provided. A document size identification process executed by the controller 11 shall be described in greater detail below.

Figure 2B:
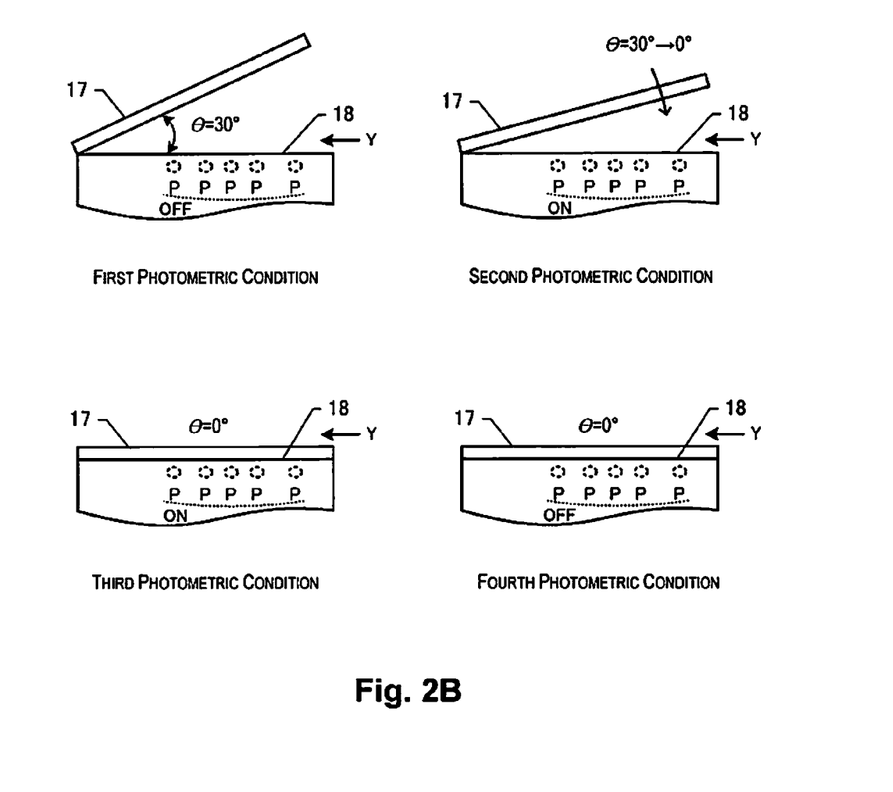
FIG. 2B is a schematic view illustrating a photometric condition.

FIG. 2B is a schematic diagram illustrating a first photometric condition through fourth photometric condition of the scan unit 15 for cases where intensity of light measured by the photometric units of the document sensors P is being measured in the document size identification process. As illustrated in FIG. 2B, the first photometric condition is a condition where light is being measured during a period where the document cover 17 is in the half-open state and where the light-emitting units of the document sensors P are not emitting light. The second photometric condition is a condition where light is being measured during a period where the angle θ of the document cover 17 is being changed so as to change from the half-open state to the fully closed state, and where the light-emitting units of the document sensors P are being made to emit light. The third photometric condition is a condition where light is being measured during a period where the document cover 17 is in the fully closed state and where the light-emitting units of the document sensors P are being made to emit light. The fourth photometric condition is a condition where light is being measured during a period where the document cover 17 is in the fully closed state and the light emitting units of the document sensors P are not emitting light.

Figure 3:
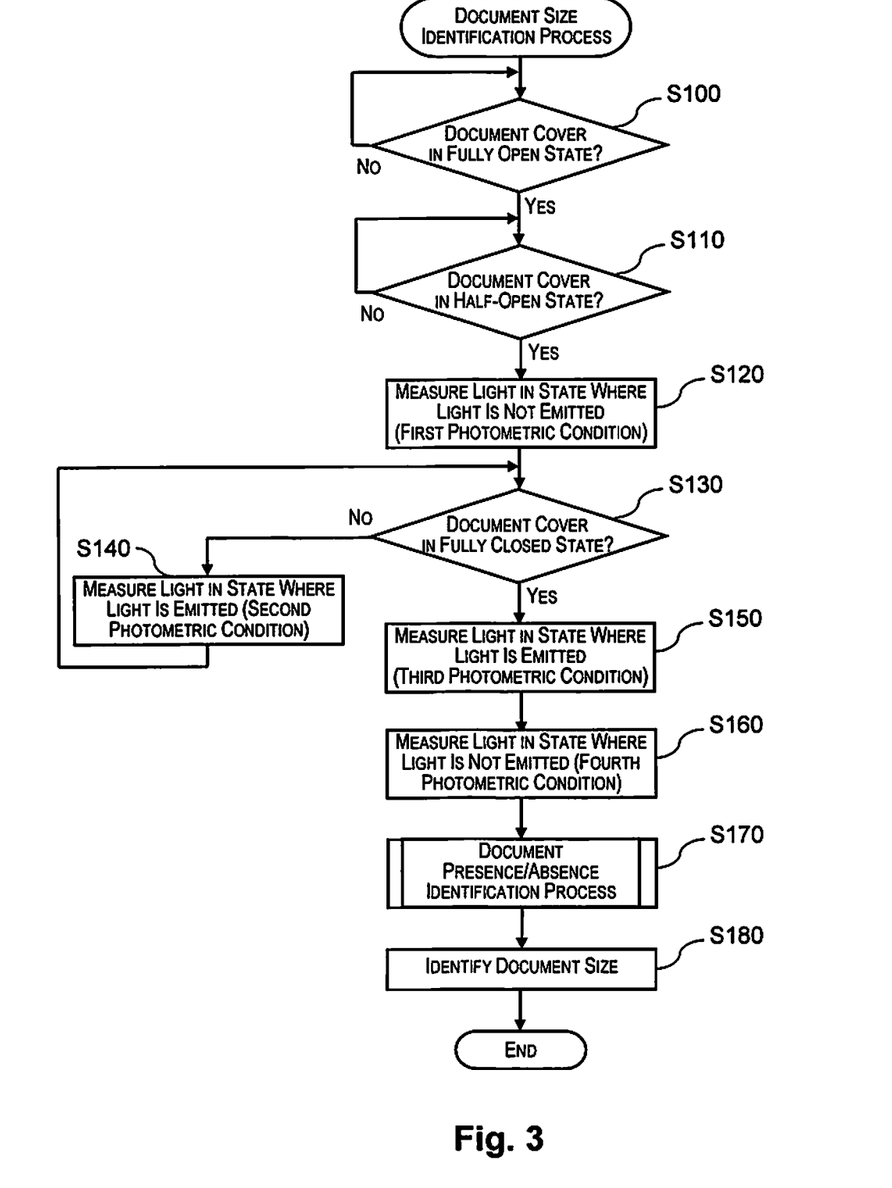
FIG. 3 is a flow chart for a document size identification process.

FIG. 3 is a flow chart for the document size identification process. The document size identification process is a process executed by the controller 11. More specifically, the document size identification process is performed by the CPU of the controller 11 executing a document size identification program recorded onto the non-volatile memory of the controller 11. The document size identification process is a process that begins in a case where the scan function is selected by the user; the scan function may be selected, for example, at an input unit such as a switch or touch panel provided to the MFP 10, at the external PC 6, or the like. The scan function may also be selected in response to when the document cover 17 is opened.

First, the controller 11 determines whether or not the document cover 17 has reached the fully open state (step S100). Specifically, the controller 11 determines whether or not the document cover 17 is in the fully open state on the basis of the signal coming from the third opening and closing sensor 0. In the event that the document cover 17 has reached the fully open state after the scan function has been selected, the user is presumed to have placed the document Q on the document platen 18. In a case where the document cover 17 is not determined to have reached the fully open state (step S100: N), then the controller 11 returns to step S100. That is to say, the controller 11 is on standby until the user places the document Q on the document platen 18. It shall be readily understood that the user may be presumed to have placed the document Q on the document platen 18 by another method, or the placement of the document Q on the document platen 18 by the user may be detected with a sensor.

In a case where the document cover 17 is determined to have reached the fully open state (step S100: Y), however, the controller 11 determines whether or not the document cover 17 has reached the half-open state (step S110). Specifically, the controller 11 determines whether or not the document cover 17 has reached the half-open state on the basis of the signal coming from the first opening and closing sensor O. In the event that the document cover 17 has reached the fully open state and thereafter the document cover 17 has reached the half-open state, then the user can be viewed as having finished placing the document Q on the document platen 18 and as making an attempt to begin the scanning of the document Q. In a case where the document cover 17 is not determined to have reached the half-open state (step S110: N), the controller 11 returns to step S110. That is to say, the controller 11 is on standby until the placement of the document Q on the document platen 18 is finished.

In a case where the document cover 17 is determined to have reached the half-open state (step S110: Y), however, the controller 11 acquires the signals indicative of the intensity of light measured by the photometric unit of each of the document sensors P, in a state where the light-emitting unit of each of the document sensors P is not being made to emit light (step S120). That is to say, the controller acquires the signals indicative of the intensity of light measured by the photometric units of the document sensor P in the first photometric condition in FIG. 2B. The controller 11 associates the intensity of light indicated by these signals with the identification codes of the document sensors P and with the state of the scan unit 15 (the first photometric condition), and records same in the RAM or the non-volatile memory.

Next, the controller 11 determines whether or not the document cover 17 has reached the fully closed state (step S130). Specifically, the controller 11 determines whether or not the document cover 17 is in the fully closed state on the basis of the signal coming from the second opening and closing sensor O. In a case where the document cover 17 is not determined to have reached the fully closed state (step S130: N), the controller 11 acquires the signals indicative of the intensity of light measured by the photometric unit of each of the document sensors P in a state where the light-emitting unit of each of the document sensors P is being made to emit light (step S140). That is to say, the controller 11 acquires the signals indicative of the intensity of light measured by the photometric unit of each of the document sensors P in the second photometric condition in FIG. 2B. The controller 11 associates the intensity of light indicated by these signals with the identification codes of the document sensors P and with the state of the scan unit 15 (the second photometric condition), and records same in the RAM or the non-volatile memory.

Next, the controller 11 returns to step S130. Executing the loop process of steps S130 to S140 enables the controller 11 to repeatedly acquire the signals indicative of the intensity of light measured by the photometric units of the document sensors P in the period of time where the angle θ of the document cover 17 changes, from after reaching the half-open state until reaching the fully closed state. As such, the RAM or the non-volatile memory carries on accumulating the intensity of light measured by the photometric units of the document sensors P in the second photometric condition. The controller 11 loops the steps S130 to S140 for a cycle of a period of time (for example, a period of a few milliseconds). A configuration where the angle θ of the document cover 17 can be measured continuously may be employed, or the controller 11 may loop the steps S130 to S140 with a cycle where the angle θ changes by a certain amount.

In a case where the document cover 17 is determined to have reached the fully closed state (step S130: Y), the controller 11 acquires the signals indicative of the intensity of light measured by the photometric unit of each of the document sensors P in a state where the light-emitting unit of each of the document sensors P is being made to emit light (step S150). That is to say, the controller 11 acquires the signals indicative of the intensity of light measured by the photometric unit of each of the document sensors P in the third photometric condition in FIG. 2B. The controller 11 associates the intensity of light indicated by these signals with the identification codes of the document sensors P and with the state of the scan unit 15 (the third photometric condition), and records same in the RAM or the non-volatile memory.

Next, the controller 11 acquires the signals indicative of the intensity of light measured by the photometric unit of each of the document sensors P in a state where the light-emitting unit of each of the document sensors P is not being made to emit light (step S160). That is to say, the controller acquires the signals indicative of the intensity of light measured by the photometric units of the document sensor P in the fourth photometric condition in FIG. 2B. The controller 11 associates the intensity of light indicated by these signals with the identification codes of the document sensors P and with the state of the scan unit 15 (the fourth photometric condition), and records same in the RAM or the non-volatile memory. The above process enables the controller 11 to record, in the RAM or the non-volatile memory, the intensity of light measured by the photometric unit of each of the document sensors P in each of the photometric conditions. Next, the controller 11 performs a document presence/absence determination process at the position to which each of the document sensors P is provided, on the basis of the intensity of light measured by the photometric unit of each of the document sensors P in each of the photometric conditions (step S170).

Figure 4:
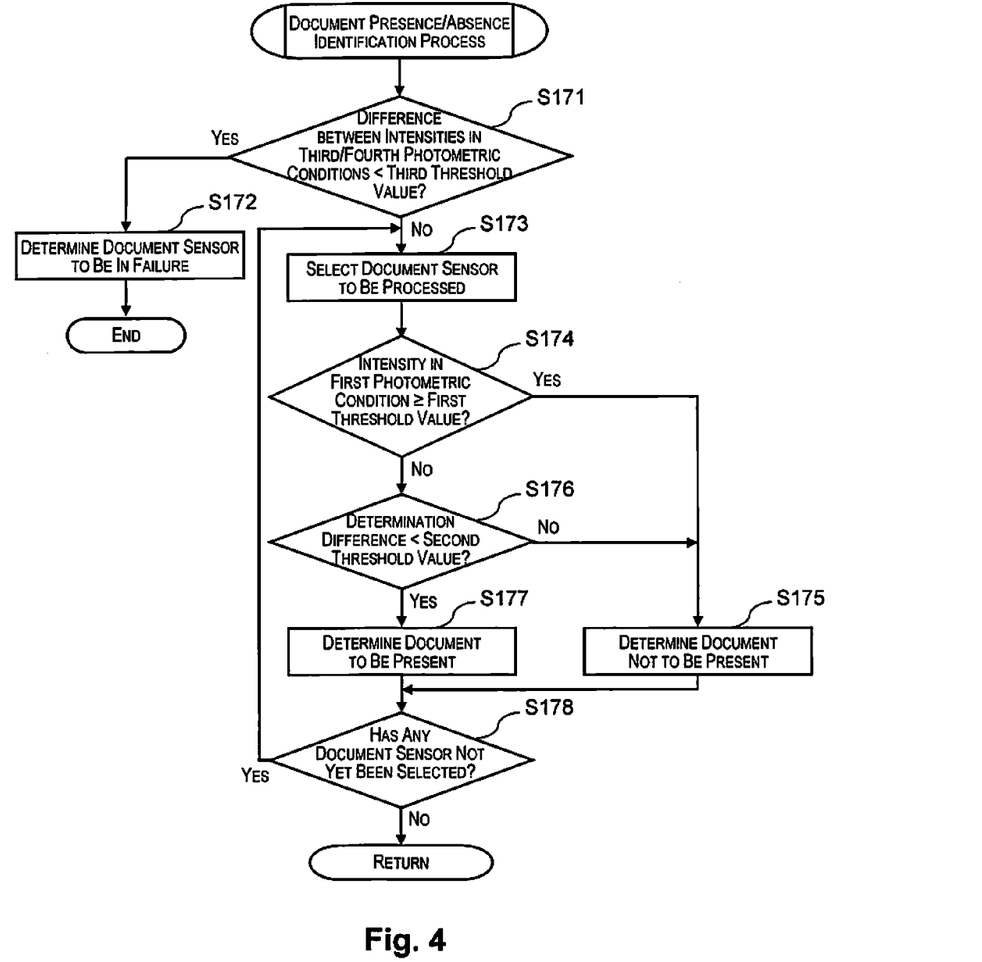
FIG. 4 is a flow chart for a document presence/absence determination process.

FIG. 4 is a flow chart for the document presence/absence determination process. First, the controller 11 determines whether or not the difference between the intensity of light measured by the photometric unit of each of the document sensors P in the fourth photometric condition in FIG. 2B and the intensity of light measured by the photometric unit of each of the document sensors P in the third photometric condition in FIG. 2B is less than a predetermined third threshold value (step S171). That is to say, the controller 11 determines whether or not the difference between the intensity of light measured by the photometric units in the fourth photometric condition where the document cover 17 is closed and the light-emitting units are not emitting light and the intensity of light measured by the photometric units in the third condition where the document cover 17 is closed and the light-emitting units are emitting light is less than the third threshold value. In a case where the difference between the intensity of light measured by the photometric unit of each of the document sensors P in the fourth photometric condition and the intensity of light measured by the photometric unit of each of the document sensors P in the third photometric condition is determined to be less than the predetermined third threshold value (step S171: Y), then the controller 11 determines that the document sensors P have failed (step S172). The controller 11 then terminates the document size identification process. In the present embodiment, the controller 11 terminates the document size identification process in a case where the difference between the intensity of light measured by the photometric unit of each of the document sensors P in the fourth photometric condition and the intensity of light measured by the photometric unit of each of the document sensors P in the third photometric condition is less than the third threshold value even at only one of the plurality of document sensors P. In such a case, the controller 11 may cause the user I/F unit 12 to display a message prompting the user to designate the document size.

Figure 5A:
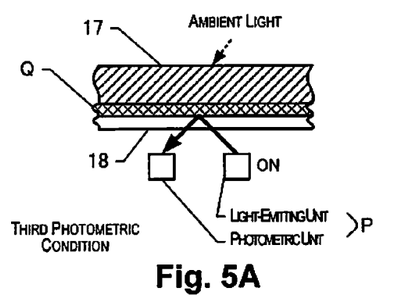
FIG. 5A is a schematic diagram of the document sensor.
Figure 5B:
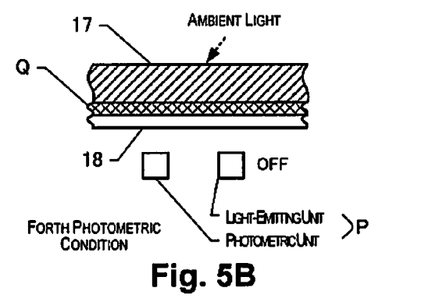
FIG. 5B is the schematic diagram of the document sensor.

FIG. 5A is a schematic diagram illustrating the circumstances of a document sensor P in the third photometric condition, and FIG. 5B is a schematic diagram illustrating the circumstances of a document sensor P in the fourth photometric condition. In both the third photometric condition and the fourth photometric condition, the document cover 17 is in the fully closed state and the ambient light is blocked by the document cover 17. As such, in the fourth photometric condition where the light-emitting units of the document sensors are not emitting light, the intensity of light measured by the photometric units is smaller irrespective of whether or not the document Q, indicated by hatching, is present. In the third photometric condition where the light-emitting units of the document sensors P are emitting light, the intensity of light measured by the photometric units is greater, because the light emitted by the light-emitting units is reflected at the document Q or the document cover 17 and measured at the photometric units. That is to say, the difference between the intensity of light measured by the photometric unit of each of the document sensors P in the fourth photometric condition and the intensity of light measured by the photometric unit of each of the document sensors P in the third photometric condition should be large irrespective of whether or not the document Q is present. As such, the document sensors P can be regarded as having failed in a case where the difference between the intensity of light measured by the photometric unit of each of the document sensors P in the fourth photometric condition and the intensity of light measured by the photometric unit of each of the document sensors P in the third photometric condition is less than the third threshold value. The third threshold value is recorded in the non-volatile memory. The third threshold value may be set on the basis of the difference between the intensity of light measured by the photometric units in a case where the light-emitting units are emitting light and the intensity of light measured by the photometric units in a case where the light-emitting units are not emitting light in a state where the intensity of the reflected light at the document cover 17 or the document Q is least (for example, a state where a black-colored document Q is present).

In a case where the difference between the intensity of light measured by the photometric unit of each of the document sensors P in the fourth photometric condition and the intensity of light measured by the photometric unit of each of the document sensors P in the third photometric condition is not determined to be less than the third threshold value (step S171: N), then the controller 11 selects a document sensor P to be processed (step S173). That is to say, in a case where all of the document sensors P have not failed, then the document sensors P are selected one at a time to be processed, and a process for determining whether or not the document Q is present at the position to which the relevant document sensor P to be processed is provided (steps S174~) is executed sequentially.

When the document sensor P to be processed is selected, the controller 11 determines whether or not the photometric unit of the document sensor P to be processed has measured light of an intensity not less than a first threshold value in the first photometric condition (step S174). That is to say, the controller 11 determines whether or not the photometric unit of the document sensor P to be processed has measured light of an intensity not less than the first threshold value in a case where the document cover 17 is open and the light-emitting unit is not emitting light.

Figure 5C:
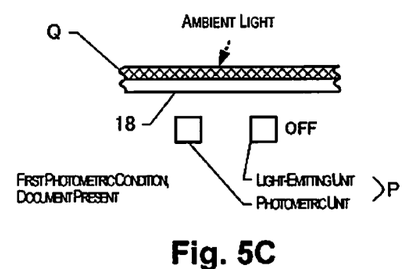
FIG. 5C is the schematic diagram of the document sensor.
Figure 5D:
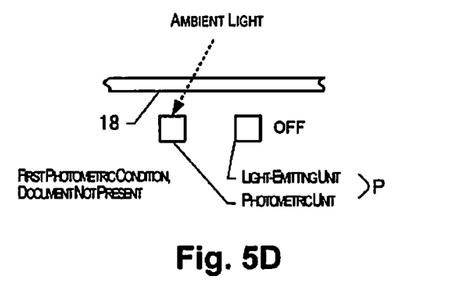
FIG. 5D is the schematic diagram of the document sensor.

FIG. 5C is a schematic diagram illustrating the circumstances of a document sensor P in the first photometric condition (in a position where the document Q is present), and FIG. 5D is a schematic diagram illustrating the circumstances of a document sensor P in the first photometric condition (in a position where the document Q is not present). In the first photometric condition, the document cover 17 is in the half-open state, and the rate of light-blocking of the ambient light by the document cover 17 is low. Also, in the first photometric condition, the light that is emitted by the light-emitting unit is not measured at the photometric unit, irrespective of whether the document Q is present or not, because the light-emitting unit is not emitting light. Here, the ambient light is blocked by the document Q in a case where the document Q is present at the position to which the document sensor P to be processed is provided, as in FIG. 5C. In turn, the ambient light is measured at the photometric unit without being blocked by the document Q in a case where the document Q is not present at the position to which the document sensor P to be processed is provided, as in FIG. 5D. As such, a position to which is provided a document sensor P that has measured light of an intensity not less than the first threshold value in the first photometric condition can be determined to be a position where the document Q is not present. The first threshold value is recorded in the non-volatile memory.

In a case where the photometric unit of the document sensor P to be processed is determined to have measured light of an intensity equal to or more than the first threshold value in the first photometric condition (step S174: Y), then the controller 11 determines that the document Q is not present at the position to which the document sensor P to be processed is provided (step S175). In a case where the photometric unit of the document sensor P to be processed is determined to have measured light of an intensity equal to or more than the predetermined first threshold value in the first photometric condition (step S174: N), then the controller 11 executes the process of step S176 on the document sensor P to be processed. A position, out of the positions to which the document sensors P are provided, where the photometric unit does not measure light of an intensity equal to or more than the first threshold value in the first photometric condition and the process of step S176 is executed corresponds to a position subject to determination of the present invention. In turn, a position, out of the positions to which the document sensors P are provided, where the photometric unit does measure light of an intensity equal to or more than the first threshold value in the first photometric condition does not correspond to a position subject to determination of the present invention, and the process of step S176 is skipped.

In step S176, the controller 11 determines whether or not a determination difference is less than a predetermined second threshold value (step S176), the determination difference being the difference between the minimum value of the intensity of light measured by the photometric unit of the document sensor P to be processed in the second photometric condition and the intensity of light measured by the photometric unit of the document sensor P to be processed in the third photometric condition. That is to say, the controller 11 determines whether or not the determination difference is less than the predetermined second threshold value, the determination difference being the difference between the minimum value of the intensity of light measured by the photometric unit in the second photometric condition, where the document cover 17 is open, the angle θ of the document cover 17 has been changed, and the light-emitting unit is emitting light, and the intensity of light measured by the photometric unit in the third photometric condition, where the document cover 17 is closed and the light-emitting unit is emitting light. The second photometric condition and the third photometric condition are photometric conditions that are different from the first photometric condition.

In a case where the determination difference is determined to be less than the second threshold value (step S176: Y), then the controller 11 determines that the document Q is present at the position subject to determination to which the photometric unit of the document sensor P to be processed is provided (step S177). In a case where the determination difference is determined to not be less than the second threshold value (step S176: N), however, the controller 11 determines that the document Q is not present at the position subject to determination to which the photometric unit of the document sensor P to be processed is provided (step S175).

Figure 5E:
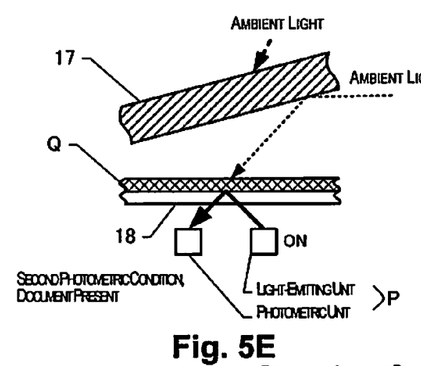
FIG. 5E is the schematic diagram of the document sensor.
Figure 5F:
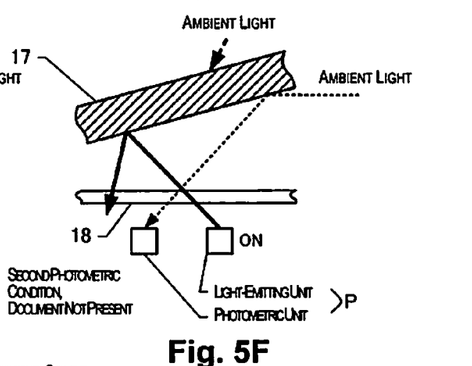
FIG. 5F is the schematic diagram of the document sensor.

FIG. 5E is a schematic diagram illustrating the circumstances of a document sensor P in the second photometric condition (in a position where the document Q is present), and FIG. 5F is a schematic diagram illustrating the circumstances of a document sensor P in the second photometric condition (in a position where the document Q is not present). The second photometric condition is a state where the angle θ of the document cover 17 is changed from the half-open state (30°) to the fully closed state (0°). As in FIG. 5E, for the photometric unit of a position where the document Q is present, the ambient light is blocked by the document Q and the reflected light obtained when the light emitted by the light-emitting unit is reflected at the document Q is measured. The intensity of light emitted by the light-emitting unit is constant, as is the positional relationship between the document Q and the document sensor P, and therefore light of a substantially constant intensity will be measured at the photometric unit in a case where the document Q is present, irrespective of the angle θ of the document cover 17. The state of light measured by the photometric unit does not change in the third photometric condition where the document cover is closed (FIG. 5A), either, and therefore the determination difference is small at a position where the document Q is present. As such, in a case where the determination difference is less than the second threshold value, the document Q can be determined to be present at the position to which the photometric unit of document sensor P to be processed is provided.

Figure 5G:
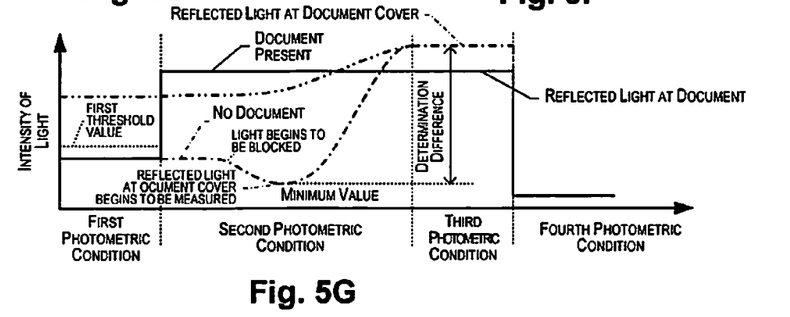
FIG. 5G is a graph of measured intensity of light.

FIG. 5G is a graph illustrating the intensity of light received by the photometric unit in each of the photometric conditions. The vertical axis in FIG. 5G represents the intensity of light received by the photometric unit, and the horizontal axis represents time. In FIG. 5G, the solid line represents the intensity of light received by the photometric unit at a position where the document is present, and the one-dot chain line represents the intensity of light received by the photometric unit at a position where the document is not present. In FIG. 5G, as illustrated with the solid line, the determination difference is substantially zero in a case where the document is present, because the reflected light at the document Q of the light emitted by the light-emitting unit is measured in the second photometric condition and the third photometric condition.

In turn, as in FIG. 5F, the photometric unit at a position where the document Q is not present measures the ambient light in the second photometric condition where the document cover 17 is open, and measures the reflected light obtained when the light emitted by the light-emitting unit is reflected at the document cover in the third photometric condition where the document cover 17 is closed. Essentially, the reflected light obtained when the light emitted by the light-emitting unit is reflected at the document cover 17 is more intensely measured than the ambient light is. As such, the document Q can be determined not to be present at the position subject to determination in a case where there is a large difference between the intensity of light (the intensity of ambient light) measured by the photometric unit in a case where the document cover 17 is open and the light-emitting unit is emitting light and the intensity of light (intensity of reflected light of the light emitted by the light-emitting unit) measured by the photometric unit in a case where the document cover is closed and the light-emitting unit is emitting light.

When the ambient light is measured at the beginning of the second photometric condition and the angle θ of the document cover 17 is smaller, as illustrated with the one-dot chain line in FIG. 5G, the reflected light obtained when the light emitted by the light-emitting unit is reflected at the document cover 17 is measured, and the photometric unit measures the light as being intense. In the second photometric condition, the angle 9 of the document cover 17 at which the reflected light obtained when the light emitted by the light-emitting unit is reflected at the document cover 17 begins to be measured as being intense is dependent on the position at which the photometric unit is present. However, acquiring a determination angle on the basis of the minimum value of the intensity of light measured by the photometric unit in the second photometric condition where the angle θ of the document cover 17 changes makes it possible to assess the extent to which the intensity of light of the ambient light in the second photometric condition is small relative to the intensity of light of the reflected light obtained when the light emitted by the light-emitting unit is reflected at the document cover in the third photometric condition. That is to say, in the event that there is a large determination difference, which is the difference between the minimum value of the intensity of ambient light in the second photometric condition and the intensity of the reflected light obtained when the light emitted by the light-emitting unit is reflected at the document cover 17 in the third photometric condition, then the ambient light has been received at the second photometric condition, and the position can be determined to be one where the document is not present.

In an environment where the ambient light is intense, as represented with the two-dot chain line in FIG. 5G, the determination difference is smaller than the second threshold value even at a position where the document Q is not present, and an erroneous determination that the document Q is present could also conceivably take place. However, the erroneous determination that the document Q is present can be prevented, because in the case where the ambient light is intense, light of an intensity not less than the first threshold value would be measured in the first photometric condition (FIG. 5D) where the document cover is open and the light-emitting unit is not emitting light, and the document Q would be determined not to be present (step S175).

As such, the document Q can be determined at high accuracy not to be present at the position subject to determination in a case where there is a large difference between the minimum value (minimum value of the intensity of the ambient light) of the intensity of light measured by the photometric unit in a case where the document cover 17 is open and the light-emitting unit is emitting light and the intensity (intensity of the reflected light of the light emitted by the light-emitting unit) of light measured by the photometric unit in a case where the document cover 17 is closed and the light-emitting unit is emitting light. Though a greater number of intensities of light require calculation processing in a case where the minimum value of the intensity of light measured by the photometric units in the duration of time where the angle θ of the document cover 17 changes is acquired in this manner, the document size can be efficiently identified because the positions subject to calculation processing have been narrowed down to the positions subject to determination in advance.

The second threshold value is recorded in the non-volatile memory. The second threshold value may be obtained by investigating the determination difference in the photometric unit of a document sensor P of a position at which the document Q is not present in a state where the determination difference would be smallest.

When the presence or absence of the document Q is determined in step S175 or step S177, then the controller 11 determines whether or not a document sensor P not yet selected to be processed is present (step S178). In a case a document sensor P not yet selected to be processed is determined to be present (step S178: Y), the controller 11 returns to step S173. In a case where a document sensor P not yet selected to be processed is not determined to be present (step S178: N), the controller 11 concludes the document presence/absence determination process, and returns to the document size identification process (main flow).

Executing the above processes makes it possible to determine whether or not the document Q is present for each of the positions to which the document sensors P are provided, unless one of the document sensors P has a failure. The document size can also be efficiently identified because the process for step S176 can be executed only for the position subject to determination, which is the position of a document sensor P for which the photometric unit has not measured light of an intensity not less than the first threshold value in the first photometric condition.

When the document presence/absence determination process is concluded and the flow returns to the document size identification process, then the controller 11 identifies the document size on the basis of whether or not the document Q is present at each of the positions to which the document sensors P are provided (step S180). Here, a table that sets forth the relationships of correspondence between document sizes and combinations of whether or not the document Q is present at each of the document sensors P (identification codes) is consulted to identify the document size. Thereafter, a scan setting designated from the user (includes settings for resolution, density, and the like) or a default scan setting are used to scan a region on the document platen 18 that corresponds to the identified document size. Next, the image read with the scan is transmitted to the host PC 6, or sent by fax using the fax unit 16, or the print unit 14 is used to print, depending on the mode and the like.

Other Embodiments

The number and position of the document sensors P is not limited to what is described above, and the angle understood to be the fully open state may also be 120°, 80°, or the like. The angle understood to be the half-open state, also, is not limited to being 30°, and may be another angle such as 20° or 50°. The angle understood to be the half-open state is, however, preferably 30° or less because it is more preferable for the ambient light to have difficulty shining in the half-open state. A light-emitting unit need not be present for each of the document sensors P, but rather light coming from one light-emitting unit may be received at a plurality of document sensors P. In the embodiment described above, whether or not the document Q is present was determined on the basis of the determination difference for the position subject to determination, but whether or not the document Q is present may be determined on the basis of an indicator other than the determination difference. For example, the document size may be identified by executing a predetermined image process (detecting the contours of the document Q or the like) only in a region where positions subject to determination are present out of an image obtained by imaging the document Q with the read sensor S. In such a case, the image process can still be executed efficiently. The document sensors P need not be photo-interrupters, by rather may be an integrated circuit (IC) incorporating a modulation circuit for suppressing the effects of the ambient light, a signal processing circuit, or the like. It shall be readily understood that an image for identifying a position subject to determination that is a position where light of an intensity not less than the first threshold value was not measured in the first photometric condition may be imaged by the read sensor S.

Moreover, a failure of a document sensor P was determined in the embodiment described above, but a failure of a document sensor P need not necessarily be determined. Also, though the scan unit 15 was incorporated into the MFP 10 in the embodiment described above, the present invention may also be implemented in a single-function scanner, or may be provided with other functions. A host computer such as the PC 6 connected to the MFP 10 may acquire the signals of each of the sensors of the MFP 10 and execute the document size identification process on the basis of these signals. In such a case, the MFP 10 and the host computer would be a scanner.

The document size can still be efficiently identified in the host computer in such a case.

The entire disclosure of Japanese Patent Application No. 2013-1779097, filed Aug. 30, 2013 is incorporated by reference herein.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A scanner comprising:
   a light-emitting unit configured to irradiate a document with light;
   a plurality of photometric units configured to receive light reflected by the document and output an intensity of light, the photometric units and the light-emitting unit being configured to be positioned relative to the document on the same side;
   a detection unit configured to detect a state of a document cover, the document cover being configured to cover the document from an opposite side of the photometric units; and
   a control unit configured to identify a document size on the basis of the intensity of light output in a photometric condition different from a first photometric condition by the photometric units provided to a position subject to determination that is a position excluding a position where light with an intensity equal to or more than a first threshold value is received in the first photometric condition, among a plurality of positions to which the photometric units are provided, the first photometric condition being a condition where the document cover is open and the light-emitting unit is not emitting light,
   the control unit being further configured to identify the document size by determining a position where light with an intensity equal to or more than the first threshold value in the first photometric condition is a position where the document is not present.

2. The scanner according to claim 1, wherein
the control unit identifies the document size by
acquiring a determination difference, which is a difference between a minimum value of the intensity of light in a second photometric condition where an angle of the document cover has changed and the light-emitting unit is emitting light, and the intensity of light in a third photometric condition where the document cover is closed and the light-emitting unit is emitting light,
determining that the position subject to determination where the determination difference is less than a second threshold value is a position where the document is present, and
determining that the position subject to determination where the determination difference is equal to or more than the second threshold value is a position where the document is not present.

3. The scanner according to claim 2, wherein
the second photometric condition is a condition where an angle between the document cover and a document platen has changed with an angle less than that of the first photometric condition.

4. The scanner according to claim 1, wherein
the control unit determines at least one of the photometric units and the light-emitting unit to be in failure in a case where a difference between the intensity of light in a fourth photometric condition where the document cover is closed and the light-emitting unit is not emitting light, and the intensity of light in a third photometric condition where the document cover is closed and the light-emitting unit is emitting light is less than a third threshold value.

5. The scanner according to claim 1, wherein the first photometric condition is a condition where an angle between the document cover and a document platen is 30° or less.

6. A scanner comprising:
a light-emitting unit configured to irradiate a document with light;
a plurality of photometric units configured to receive light reflected by the document and output an intensity of light, the photometric units and the light-emitting unit being configured to be positioned relative to the document on the same side;
a detection unit configured to detect a state of a document cover, the document cover being configured to cover the document from an opposite side of the photometric units; and
a control unit configured to identify a document size by
acquiring a determination difference, which is a difference between a minimum value of the intensity of light in a second photometric condition where an angle of the document cover has changed and the light-emitting unit is emitting light, and the intensity of light in a third photometric condition where the document cover is closed and the light-emitting unit is emitting light,
determining that the position subject to determination where the determination difference is less than a second threshold value is a position where the document is present, and
determining that the position subject to determination where the determination difference is equal to or more than the second threshold value is a position where the document is not present.

7. The scanner according to claim 6, wherein
the control unit determines at least one of the photometric units and the light-emitting unit to be in failure in a case where a difference between the intensity of light in a fourth photometric condition where the document cover is closed and the light-emitting unit is not emitting light, and the intensity of light in a third photometric condition where the document cover is closed and the light-emitting unit is emitting light is less than a third threshold value.

8. The scanner according to claim 6, wherein
the second photometric condition is a condition where an angle between the document cover and a document platen has changed with an angle less than that of the first photometric condition.

9. A scanner comprising:
a light-emitting unit configured to irradiate a document with light;
a plurality of photometric units configured to receive light reflected by the document and output an intensity of light, the photometric units and the light-emitting unit being configured to be positioned relative to the document on the same side;
a detection unit configured to detect a state of a document cover, the document cover being configured to cover the document from an opposite side of the photometric units; and
a control unit configured to determine at least one of the photometric units and the light-emitting unit to be in failure in a case where a difference between the intensity of light in a fourth photometric condition where the document cover is closed and the light-emitting unit is not emitting light, and the intensity of light in a third photometric condition where the document cover is closed and the light-emitting unit is emitting light is less than a third threshold value, and identify a document size by using the plurality of photometric units and the light-emitting unit in a case where it is determined that the plurality of photometric units and the light-emitting unit are not in failure.

* * * * *